J. A. SWINEHART.
TIRE TOOL.
APPLICATION FILED MAY 29, 1908.
922,541.  Patented May 25, 1909.
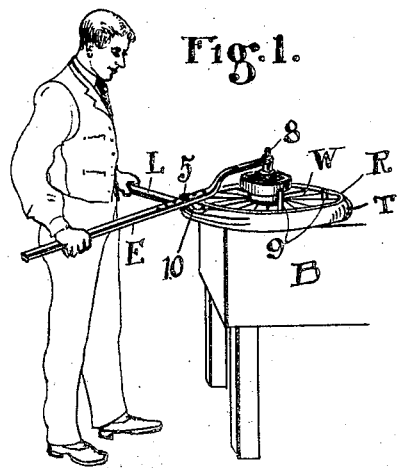
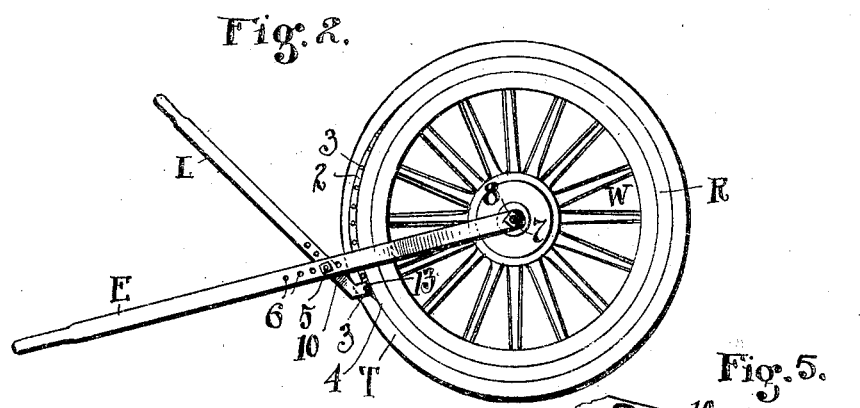
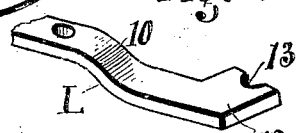
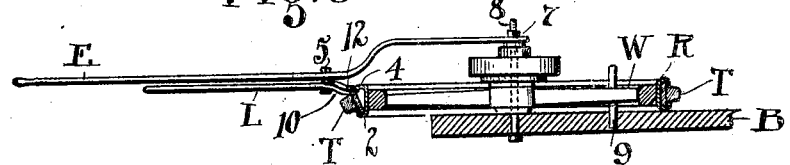
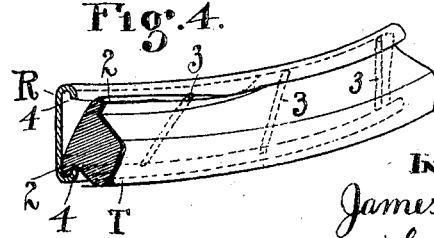
ATTEST
E. M. Fisher
J. C. Mussun
INVENTOR.
James A. Swinehart
BY Fisher & Moses ATTYS.

UNITED STATES PATENT OFFICE.

JAMES A. SWINEHART, OF AKRON, OHIO.

TIRE-TOOL.

No. 922,541.      Specification of Letters Patent.      Patented May 25, 1909.

Application filed May 29, 1908. Serial No. 435,638.

*To all whom it may concern:*

Be it known that I, JAMES A. SWINEHART, a citizen of the United States, residing at Akron, in the county of Summit and State of Ohio, have invented certain new and useful Improvements in Tire-Tools, and do declare that the following is a full, clear, and exact description of the invention, which will enable others skilled in the art to which it appertains to make and use the same.

My invention relates to a tool for putting rubber tires on clencher rim wheels, all substantially as shown and described and particularly pointed out in the claims.

In the accompanying drawings, Figure 1 is perspective view of the device in the hands of an operator in the act of putting a tire on the rim or wheel, which is shown fastened on a bench, and Fig. 2 is a side elevation of a wheel and of the tool in using position thereon, relatively as in Fig. 1. Fig. 3 is a cross section of the wheel and its immediate support, as the top of bench in Fig. 1 and an edge elevation of the tool shown as in both Figs. 1 and 2. Fig. 4 is a perspective view of a portion of a tire and rim enlarged and as when the said parts are being united by the tool, as in Fig. 3. Fig. 5 is an enlarged section of lever L.

In the accompanying drawings T represents the tire, preferably solid rubber, with flanges or beads 2, as usual, along its inner edges and transfixed at intervals with cross wires 3 projecting through said flanges at their ends.

The wheel W has a clencher rim R, so-called, with inwardly extending flanges 4 at opposite edges, adapted to receive flanges 2 of the tire.

The tool comprises the fulcrum bar or member E and the hand lever L pivoted thereon by bolt or pin 5 in any one of the series of holes 6 in said fulcrum bar according to the size of the wheel. The said fulcrum bar has an upward curve just inside the outer pivot hole 6 to bring its end above the hub of the wheel W, and is further provided with a hole 7 in its extremity for fastening bolt 8. Said bolt passes through the hub of the wheel into the top of the bench or work block B, on which the wheel is rotatably fixed by said bolt. Two or more pins 9 are adapted to hold the wheel against the action of the tool. The foregoing means, or their equivalent, may be adapted to secure the wheel, which is rotated at intervals as the work progresses and then fastened again for the next operation.

The hand lever L is pivoted at its inner end on the fulcrum member or bar E and has a downward bend 10 next beyond its pivot 5 and its extremity 12 is bent edgewise toward bar E at approximately right angles and provided with a small notch 13 adapted to engage the ends of the transverse anchoring wires 3 successively to press them beneath flange 4 of the rim.

In operation the fulcrum bar E is held in one hand, usually the right, and the working lever L in the other hand. Then with the parts to be operated upon in position as in Figs. 1, 2 and 3, my method is to first engage the tire on the rim say at four different places to hold it in right relations and then to fasten successive wires as they are approached entirely around the wheel. Normally the said anchoring wires are straight across the tire, and have projection enough in the flanges 2 of the tire to lock firmly beneath the rim flanges 4. Usually, too, these wires protrude slightly beyond the edges 2, so that there is no trouble in locating them and effecting the desired engagement. Now, assuming that all is in readiness for work, the tool is moved horizontally to such position that lever L can be engaged with the extremity of a wire 3. Then the task is to throw the wire to such an angle of inclination to its original position that the engaged end thereof will be carried inward beneath the clenched rim, when the work of the tool is done and the stretch of the tire restores the wire to its right relation. In this operation it will be understood that the lower flange 2 and the end of the wire therein are first placed into the lower clencher rim. A good plan is to tuck the rubber between wires under the rim first, and this facilitates putting in the wires. It will be seen that when the tool is moved to proper position to engage a wire, the fulcrum bar or lever is held firm in a working relation while the real work is done by or through short lever L, fulcrumed at 5.

The cross parts 3 are generally made of wire of a suitable size, but sometimes are referred to as cross-bars, and may be of wire or its equivalent.

The engaging extremity of lever L is approximately right angled to the body of said lever, and this portion is outside of the immediate bend 10 next to the pivot.

What I claim is:

1. A tire tool comprising a fulcrum lever constructed at one end with a hole adapted to be rotatably engaged in the axis of a wheel, and a working lever pivoted near one end at about the middle of said fulcrum lever and constructed at said pivoted end to engage a transverse anchoring projection at the edge of a tire.

2. A tool to place tires on clencher rims, consisting of two levers of different lengths, one of said levers adapted to be rotatably fixed at one end and having a handle at the other end, and the other lever pivoted at the middle of the first named lever and having a handle at one end and an engaging portion at one side of the other end, said levers bent outward from each other from and beyond their pivot connection.

In testimony whereof I sign this specification in the presence of two witnesses.

JAMES A. SWINEHART.

Witnesses:
C. O. BAUGHMAN,
H. W. MIHILLS.